United States Patent
Jacumet (10) Patent No.: US 8,525,878 B2
(45) Date of Patent: Sep. 3, 2013

(54) METHOD FOR PROCESSING FILM IMAGES DEVIATED FROM A FILM RECORDING OPTICAL PATH OF A MOVING PICTURE CAMERA

(75) Inventor: Klaus Jacumet, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 1365 days.

(21) Appl. No.: 10/541,917

(22) PCT Filed: Dec. 30, 2003

(86) PCT No.: PCT/DE03/04298
§ 371 (c)(1), (2), (4) Date: Jul. 11, 2005

(87) PCT Pub. No.: WO2004/064389
PCT Pub. Date: Jul. 29, 2004

(65) Prior Publication Data
US 2006/0125931 A1    Jun. 15, 2006

(30) Foreign Application Priority Data
Jan. 13, 2003 (DE) .................................. 103 01 714

(51) Int. Cl.
*H04N 3/36* (2006.01)
*H04N 9/11* (2006.01)
*H04N 5/253* (2006.01)

(52) U.S. Cl.
USPC .................... 348/97; 348/61; 348/96; 348/98

(58) Field of Classification Search
USPC .............................................. 348/61, 96, 98
See application file for complete search history.

(56) References Cited

U.S. PATENT DOCUMENTS
4,928,171 A    5/1990 Kline
5,337,154 A *  8/1994 Dorricott et al. .............. 348/448

(Continued)

FOREIGN PATENT DOCUMENTS
DE    41 32 853 C2    4/1992
DE    42 11 427 C2    10/1993
(Continued)

OTHER PUBLICATIONS
International Search Report dated Jul. 14, 2004, of corresponding PCT/DE2003/04298.
(Continued)

*Primary Examiner* — Sath V Perungavoor
*Assistant Examiner* — Geepy Pe
(74) *Attorney, Agent, or Firm* — Christie, Parker & Hale, LLP (57) ABSTRACT

The invention relates to a method for processing film images which are deviated from the film-recording optical path of a moving picture camera and which are converted into digital assist signals (AS) with the aid of an image sensor which is arranged in the assist optical path (S4) of the moving picture camera which is periodically interrupted according to the image-recording frequency of the moving picture camera. Said assist signals are fed to a data processing device at an image frequency corresponding to the image-recording frequency of the moving picture camera. Said data processing device processes the assist images derived from the digital assist signal (AS) at the image-recording frequency of the moving picture camera. In order to display the assist images at an assist frequency or the image-recording frequency of the moving picture camera, the data processing device transmits the digital assist signals (AS) to a digital storage device or transmits them to a monitor in order to display the assist images at a standardized image frequency, e.g. 24 images/sec. The camera assist device is adapted to the peculiarities of the moving picture camera and enables, in particular, representation of special effects such as slow motion and quick motion which are generated with the aid of a moving picture film.

31 Claims, 5 Drawing Sheets

(56) References Cited

U.S. PATENT DOCUMENTS

| | | | |
|---|---|---|---|
| 5,877,821 A * | 3/1999 | Newlin et al. | 348/724 |
| 5,946,445 A | 8/1999 | Peters et al. | |
| 6,058,236 A | 5/2000 | Peters et al. | |
| 6,353,461 B1 | 3/2002 | Shore et al. | |
| 6,690,049 B2 * | 2/2004 | Suzuki et al. | 257/294 |

FOREIGN PATENT DOCUMENTS

| | | |
|---|---|---|
| DE | 195 44 789 A | 3/1997 |
| DE | 198 24 571 A1 | 12/1999 |
| DE | 100 43 961 A2 | 4/2002 |
| EP | 0 162 311 A2 | 11/1985 |
| EP | 0 884 895 A2 | 12/1998 |
| EP | 0 910 814 B1 | 4/1999 |
| EP | 0 963 113 A2 | 12/1999 |
| WO | WO 98/51075 | 11/1998 |
| WO | WO 99/65238 | 12/1999 |

OTHER PUBLICATIONS

S. Nouri, "Professional DV—Ein Weltstandard im Einsatz" Fernseh-Und Kino-Technik, vol. 55, No. 10, Oct. 2001, pp. 612-616, XP-001101099.

Cinecorder-NX, Digital Video-Assist System, Product Specification Sheet, Online, Jan. 6, 2000, pp. 1-3, XP-002286937, URL:www.videoassist.com 'retrieved on Jun. 30, 2004.

Cinelog 3., Product Specification Sheet, Online, Dec. 3, 1999, pp. 1-8, XP-002286938, URL:www.videoassist.com 'retrieved on Jun. 30, 2004.

Näther, H., et al., *Multi-Standard Image Sequence Storage-Digital Video Silicon Recorder DVSR 1000 and Viewstore VS 5000*; SPIE vol. 1976 High-Defmition Video, Nov. 1993, pp. 303-311.

Jäime, B, et al., *Technische Bildverarbeitung—Maschinelles Sehen*, Springer 1996, ISBN: 3-540-58641-5; Kapitel 2.2: Bildgewinnung, pp. 39-48.

Hoffmann, H, *EBU/SMPTE Joint Task Force for Harmonised Standards for the Exchange of Television Programmes as Bit Streams-A Progress Report*, International Broadcasting Convention, Sep. 12-16, 1997; Conference Publication No. 447, IEE 1997, pp. 367-373.

Examination Report, dated Jan. 31, 2006, for Application No. 103 01 714.3-31, in the name of Arnold & Richter Cine Technik GmbH & Co. Betriebs KG.

English translation of IPER for International application No. PCT/DE2003/004298, International filed Dec. 30, 2003, dated Apr. 1, 2005, in the name of Arnold & Richter Cine Technik GmbH & Co. Betriebs KG.

* cited by examiner

METHOD FOR PROCESSING FILM IMAGES DEVIATED FROM A FILM RECORDING OPTICAL PATH OF A MOVING PICTURE CAMERA

CROSS-REFERENCE TO RELATED APPLICATION

This application is a National Phase Patent Application of International Application Number PCT/DE2003/004298, filed on Dec. 30, 2003, which claims priority of German Patent Application Number 103 01 714.3, filed on Jan. 13, 2003.

BACKGROUND OF THE INVENTION

The invention relates to a method for processing film images deviated from a film recording optical path of a moving picture camera and to a device for implementing the method.

From U.S. Pat. No. 4,928,171 a video device is known for a moving picture camera in which a video image sensor is mounted in an optical path of the moving picture camera which is periodically interrupted according to the image-recording frequency of the moving picture camera. A video device of this kind serves to produce parallel to the exposure of film images of the moving picture film a video image which on the one hand during film recording enables the picture to be viewed independently of looking into the camera viewfinder and on the other hand makes it easier to refinish the exposed moving picture film using recorded video sequences.

For this purpose a part of the recording optical path of the moving picture camera is divided off into a video path and directed to a video image sensor or video camera. The recording lens of the moving picture camera thereby projects an image in the image plane of the moving picture film which is moved intermittently for example with a film transport speed of 24 images per second when a rotatable mirror aperture mounted in the recording beam path of the moving picture camera behind the recording lens releases the recording beam path during exposure of a film image. In the time in which the moving picture film is moved further by a film image division the movable mirror aperture covers the recording path to the image plane and diverts the film image onto the plane of a matt disc or fibre plate from where the ensuing image is copied via a video optic to a video image sensor.

The video image sensor integrates the light of the video beam path falling on its light-sensitive layer. The integrated signals are periodically picked out from the video image sensor and displayed as video output signals on a video monitor or are stored on a suitable storage medium.

Between the matt disc or fibre plate and the video optic is at least one further beam divider which diverts the image of the matt disc or fibre plate to an eyepiece through which a cameraman can view the film image on the matt disc.

As a result of the periodic interruption of the recording path of the moving picture camera according to the image recording frequency of the moving picture camera, no light passes onto the video image sensor during the film exposure which—apart from special cases-leads to image flickering of the video image which can be generated with the video output signal of the video image sensor. This flickering of the image is intensified if the time active for loading an image point of the loading image of the video image sensor between the last unloading reading and the next unloading reading of the loading image of the video image sensor is shortened through time intervals which change from image to image during which the video path to the video image sensor is interrupted.

The relevant time span of the active exposure for an image point of the loading image of the video image sensor between an unloading reading of the loading image to generate the video output signal and the next unloading reading of the loading image for generating the next video output signal is thereby a different length from image to image since the usual image recording frequency of a moving picture camera only agrees with the video frequency of the video device in exceptional cases. Thus for example the picture recording frequency of a moving picture camera normally amounts to 24 images per second, whilst the video frequency of a video device with a PAL system amounts to 50 images per second and with an NTSC system to 60 images per second. This image flickering results in a light/dark change of a video image or video semi image which makes viewing the video image difficult or even impossible.

In order to eliminate or reduce this image flickering it is known from U.S. Pat. No. 4,928,171 to control the video image sensor light-sensitive only when light is available in the video beam path. The video image sensor is thereby coupled to the moving picture camera in respect of the video frequency and phase position. In order to obtain from this again standard video signals with 25 (PAL system) or 30 images per second (NTSC system) the video signals of the video image sensor or the video camera connected thereto are stored interim in the frequency of the video image sensor and are retrieved from the intermediate store in the standard video signal frequency.

Thus, independently of the film transport speed or image recording frequency of the moving picture camera, the video output signal of the known video device corresponds to the standard video image frequency and is provided at the output of the video device in the form of a FBAS (Farbart Bildanteil Abtast-und Synchronisations) signal (colour type, image content, scanning and synchronising signal) for display on a video monitor or for video signal storage.

A significant drawback of this rigid video assist system is that through the generation and issue of standard video images it is not possible to deal with special features of a moving picture film. This leads to problems when touching up or finishing the moving picture film and to dispensing with special effects which can be produced with the moving picture film but which cannot be displayed with the video device for the following reasons.

Since the standard image recording frequency of a moving picture camera amounts to 24 images, for refinishing a moving picture film and more particularly for film cutting, cutting computers are already known which operate with a time resolution of 24 images per second so that when using a video recording for facilitating the refinishing of the moving picture film first it is necessary to convert the video signal in dependence on the relevant system (PAL or NTSC) with a video frequency of 25 or 30 video images per second to the image recording frequency of the moving picture camera of 24 images per second.

Furthermore the rigid standard video image frequency does not allow the reproduction of slow motion or quick motion effects of a moving picture film which was exposed with an image recording frequency deviating from the standard image recording frequency. The moving picture camera for generating a slow motion effect is moved with a higher transport speed or for generating a time-lapse effect is moved with a lower film transport speed than the standard film transport speed of image recording frequency. If the moving picture film is moved on projection again with the normal standard image recording frequency of 24 images per second then the corresponding slow motion and quick motion effects are produced. These effects can only be displayed inadequately owing to the rigid standard video image frequency.

There are indeed methods known for electronically completing these effects but all set-ups have lead to an unclear, jolting motion resolution.

Furthermore the fact that light is available in the viewfinder and thus on the video sensor for only half a complete film image cycle is the cause of a half image resolution in the video output signal. Normally an odd or even half image is always correctly exposed and the other half image is exposed at the time when the sensor does not receive any light. In order however to obtain a video picture which does not even show the disruptive light/dark sequences the contents of the unexposed half images is replaced by the content of the previously exposed half images. The information which would exist with a non-interrupted exposure in the second half image is thereby automatically lost.

SUMMARY OF THE INVENTION

In one exemplary embodiment the present invention provides a method for processing film images deviated from a film recording path of a moving picture camera which is adapted to the special features of a moving picture camera and in particular ensures a satisfactory illustration of special effects generated by a moving picture film, such as slow motion and quick motion recordings.

The solution according to the invention guarantees a processing of film images deviated from a film recording optical path of a moving picture camera adapted to the special features of a moving picture camera, and enables in particular the satisfactory display of special effects produced with a moving picture film such as slow motion and quick motion recordings, more particularly whilst retaining a full image resolution.

The solution according to the invention is based on the idea, deviating from the known methods for standard processing of video signals for flicker-free showing of video images or video half images, of issuing an electronic preferably digital assist image parallel to each film image. Since this method breaks with the standards for video image signals the format which embodies this method must be a special preferably digital format. Since this format however cannot be displayed on commercially available video recorders or video monitors the digital assist signal is sent to a data processing device in which or by which the electronic assist image is displayed or stored on a monitor. It is thereby possible to transfer electronic assist images for example with 35 images per second, i.e. as a slight slow motion to the data processing device. The assist images are there first shown and/or recorded in real time, thus exactly as the scene recorded by the moving picture camera. Furthermore the stored scene can then be reproduced again in real time or as slow motion or quick motion with the assumption of a viewing speed of for example 24 images per second depending on the recording speed.

Accordingly with the method according to the invention for processing film images deviated from a film recording optical path of a moving picture camera digital assist signals are sent in an image frequency coinciding with the image recording frequency of the moving picture camera to a data processing device which processes assist images formed from the digital assist signals in the image recording frequency of the moving picture camera. The data processing device sends out the digital assist signals for the display of the assist image in an assist image frequency or the image recording frequency of the moving picture camera to a digital storage device or in a standard image frequency, for example 24 images per second, to a monitor.

The assist images can optionally be forwarded as digital video signals, FBAS or Y/C (Luminance and Chrominance) signals to display or digital or analogue storage devices.

An advantageous variation of the method according to the invention is characterised by a separate video branch corresponding to a previously known video assist in which conventional video signals are sent to conventional video appliances, e.g. video monitors and video recorders in a video signal frequency corresponding to the video norm through standard interface. In a second signal path the electronic image signals or digital assist signals can be sent to the data processing unit in an image frequency coinciding with the image recording frequency of the moving picture camera.

In this development of the invention a FBAS, Y/C and DV (Digital Video) signal with 25 to 30 full assist images per second is sent from the first signal path through standard interfaces whilst in the second signal path one electronic assist image per film picture is sent to the data processing device so that it is possible to use both a flicker-free standard operation and an operating mode set up to the special properties and possibilities of the moving picture camera.

If the moving picture camera runs at a speed or with an image recording frequency which is higher than the data rate to be transferred through the interface or higher than the speed which can be achieved with the optoelectronic converter, i.e. at a speed of more than about 50 to 60 images per second, then only each second electronic assist image is transferred to the data processing device. In this mode the light of two passages through the mirror aperture is optionally integrated. A higher exposure of the optoelectronic converter is thereby achieved. Since this mode in any case assembles two film images into one electronic assist image this mode can be switched off in order to obtain clarity on the classification of the images.

Through a return channel to this interface, camera and assist control data can be sent from the data processing unit to the moving picture camera or a camera assist device connected to or integrated in the moving picture camera whilst conversely additional recording, control or status signals or data such as for example camera status information can be sent back on a meta-data channel to the data processing unit so that a mode thereby arises for example which automatically records the assist images in the data processing unit when the moving picture camera is running.

Furthermore it is possible to provide an insertion of selective control, status and/or recording data into the image for additional information for example when refinishing a moving picture film. The insertion can either be superimposed on the image content so that it also remains when downloading information from the data processing unit on classic video systems, or can be displayed in addition to the actual image content on free areas of a monitor. Since the meta data can be stored parallel to the actual assist images in the data processing unit they can be displayed within this unit again and again even outside of the actual image zone.

Thus the data processing unit undertakes the clearly readable insertion of important data into the assist image or on the assist monitor and can send the data as standard video signal e.g. to a video recorder or video monitor or directly through file copying, thus not as a video signal, to an interface computer which is provided for refinishing the moving picture film.

A preferred embodiment of the method according to the invention is characterised in that the light conditions in the assist optical path of the moving picture camera are represented through corresponding aperture index signals which are sent through aperture index signal editing to the optoelectronic converter which in dependence on the edited aperture index signals in a first exposure mode integrates the amount of light in the assist optical path from one dark phase of the assist optical path up to the next dark phase whereby the integrated amount of light is retrieved at the end of integration by an image editing device.

In a second exposure mode the exposure time of the optoelectronic converter is set to a predeterminable value, preferably to the film exposure time of the moving picture camera. The amount of light of the assist optical path from a start value in the light phase to an end value in this light phase is integrated and the integrated amount of light after the end of integration which corresponds timewise to the predetermined value is retrieved from the image editing device. Thus in a preferred embodiment of the middle of the set exposure time of the optoelectronic converter can be set to the middle of the light phase in the assist optical path. Also in this mode with a camera running speed above the maximum frequency of the assist system several aperture passes are combined into one assist image.

After detecting the image and sending the digital assist images through the or each optoelectronic converter the digital assist image is calculated whereby with a single optoelectronic converter the colour mask of the optoelectronic converter is decoded and in the case of several optoelectronic converters the images of the optoelectronic converters are combined with each other. The image data of the digital assist images are then sent to an image compressing device which compresses the image data of the digital assist images and sent through lead drivers in dependence on the image recording frequency of the moving picture camera to the data processing device which stores and decompresses the image data of the digital assist images and edits them controlled by a timing control for display on an external or internal monitor.

Just before the compressing of the image data there is the possibility of decoupling a data path for a monitor direct from the camera assist device of the moving picture camera. A conventional computer monitor with VGA or XVGA is thereby used as monitor.

The signal and data exchange between the camera assist device and the data processing unit preferably takes place binary coded, more particularly as PCM signal (pulse code modulation) whereby the signals and data are transferred cable bonded, through light wave conductors or glass fibres, by means of a carrier frequency system or through an infrared interface.

A device for carrying out the method is characterised by a camera assist device with an image sensor directed to the assist optical path and a data processing unit which receives the digital assist signals sent by the camera assist device in an image frequency coinciding with the image recording frequency of the moving picture camera, and which processes the digital assist images assembled from the digital assist signals in the image recording frequency of the moving picture camera.

The data processing device is preferably connected to a digital storage device and/or a monitor and consists of a personal computer (PC) on the monitor of which the electronic images can be viewed.

The transfer of electronic images from the assist device to the personal computer can be carried out in particular through a fire-wire interface of the personal computer so that no additional hardware requirements need be met for carrying out the method according to the invention. However an independent transfer system is advisable specially for the flexible transfer of electronic images without fixed image frequencies.

As image sensor mounted in the assist optical path of the moving picture camera can be used selectively a CCD (Charge-Coupled Device) chip, a C-MOS-image (Complementary Metal Oxide Semicondustor-image) sensor or an image tube which works in particular in the progressive scan operation although the use of an interlaced chip is likewise fundamentally possible.

A further advantageous development is characterised by an input field for the operating settings which are carried out through graphically displayed operating elements of the camera assist device. By way of example guidelines can be provided at the input field on the signal strength, colour setting, exposure mode and other possible settings of the moving picture camera. The data is sent through a return lead to the camera assist device of the moving picture camera back to a control of the camera assist device from where it acts on the image sensor or image editor or is provided through a corresponding interface as camera control signals of the moving picture camera.

BRIEF DESCRIPTION OF THE DRAWINGS

The idea on which the invention is based will now be explained in further detail with reference to the embodiments illustrated in the drawings. They show.

BRIEF DESCRIPTION OF THE INVENTION

Figure 1:
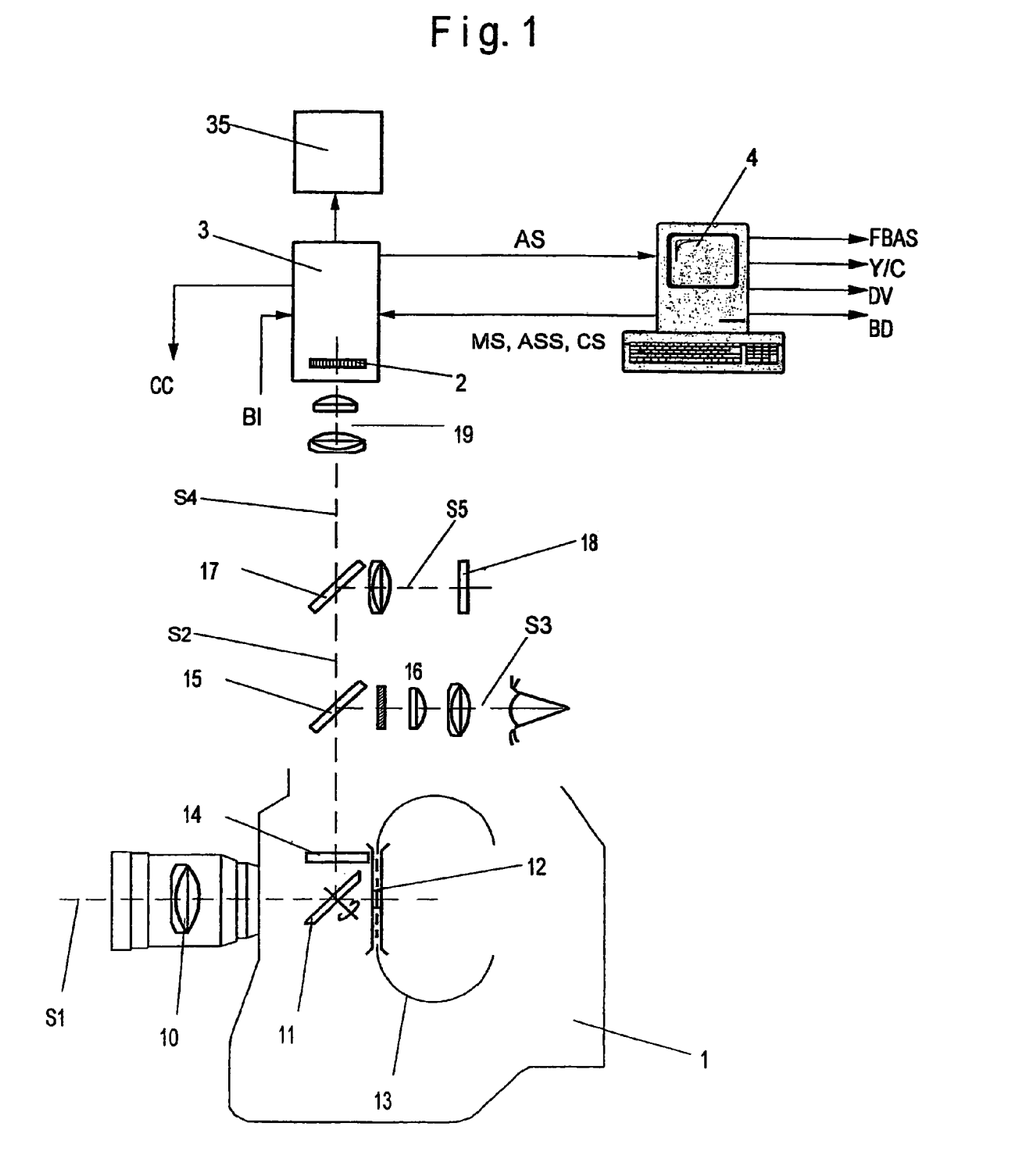
FIG. 1 a diagrammatic view of the optical path of a moving picture camera with a rotating mirror aperture and a camera assist unit.

The optical system of a moving picture camera 1 shown diagrammatically in FIG. 1 with a camera assist device 2,3 has a recording lens 10 through which a recording optical path S1 enters into the moving picture camera 1 and strikes a rotating mirror aperture 11. The rotating mirror aperture 11 is normally comprised of a semicircular mirror surface with a circumferential angle of normally 180° and an aperture adjusting wing mounted coaxial with the mirror surface and adjustable opposite the mirror surface so that aperture opening angles of 0° to 180° can be set for the rotating mirror aperture 11.

Depending on the angular position of the rotating mirror aperture 11 the recording optical path S1 strikes the opening sector (light sector) of the rotating mirror aperture 11 and passes through am image window 12 onto a moving picture film 13 which is guided in a film channel. During transport of the moving picture film 13 the image window 12 is covered by the mirror surface of the rotating mirror aperture 11 and the recording optical path S1 is diverted onto a matt screen or fibre plate 14 from where the recording optical path S1 passes through a first beam divider 15 which splits off from the recording optical path S a viewfinder optical path S3 into an eyepiece 16 through which the cameraman can view the image on the matt screen or fibre plate 14.

The beam part S2 of the recording optical path S1 passing through the first beam divider 15 passes possibly onto a second beam divider 17 which divides the beam part S2 into an exposure meter optical path S5 for an exposure meter 18 and an assist optical path S4.

The assist optical path S4 passes through an assist optic 19 to the camera assist device with an image sensor 2 which converts the optical image into image signals, and with an assist electronics 3 which generates digital signals from the image signals and sends the assist signals AS as well as where applicable further control signals and data to a personal computer 4 as well as receives control and data signals ASS, CS from the personal computer 4.

The assist electronics 3 is furthermore supplied with a mode select signal MS (Mode Select) from the personal computer 4 which produces a desired exposure mode, as well as an aperture index signal B1 from the camera which corresponds to the relevant exposure conditions of the assist optical path S4 and thus the exposure conditions on the image sensor 2. Furthermore the assist electronics 3 sends camera control signals CC to the control electronics of the moving picture camera 1.

Figure 2:
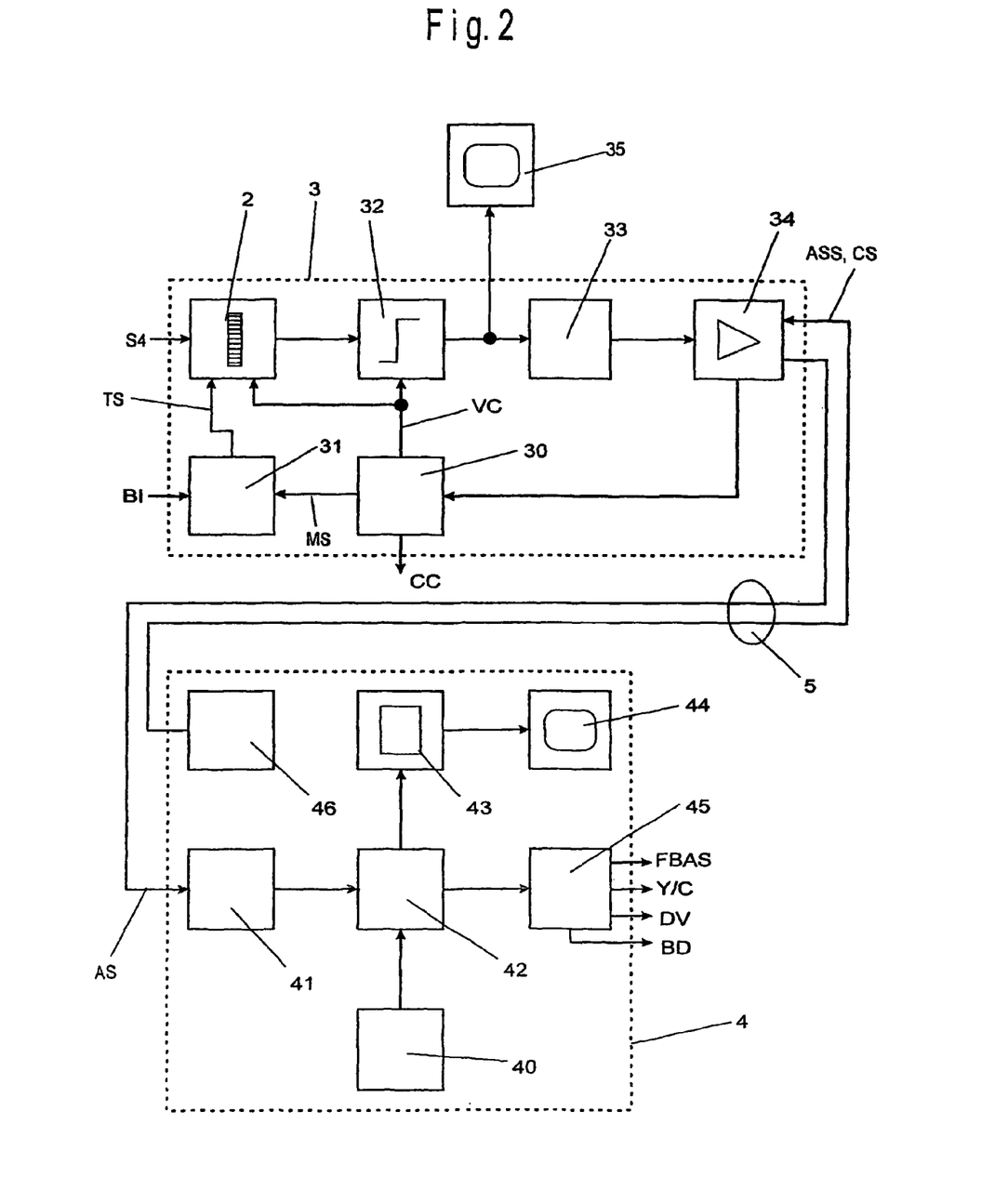
FIG. 2 a block circuit diagram of the electronics of the camera assist device and the image-processing part of a data processing device designed as a personal computer.
Figure 5:
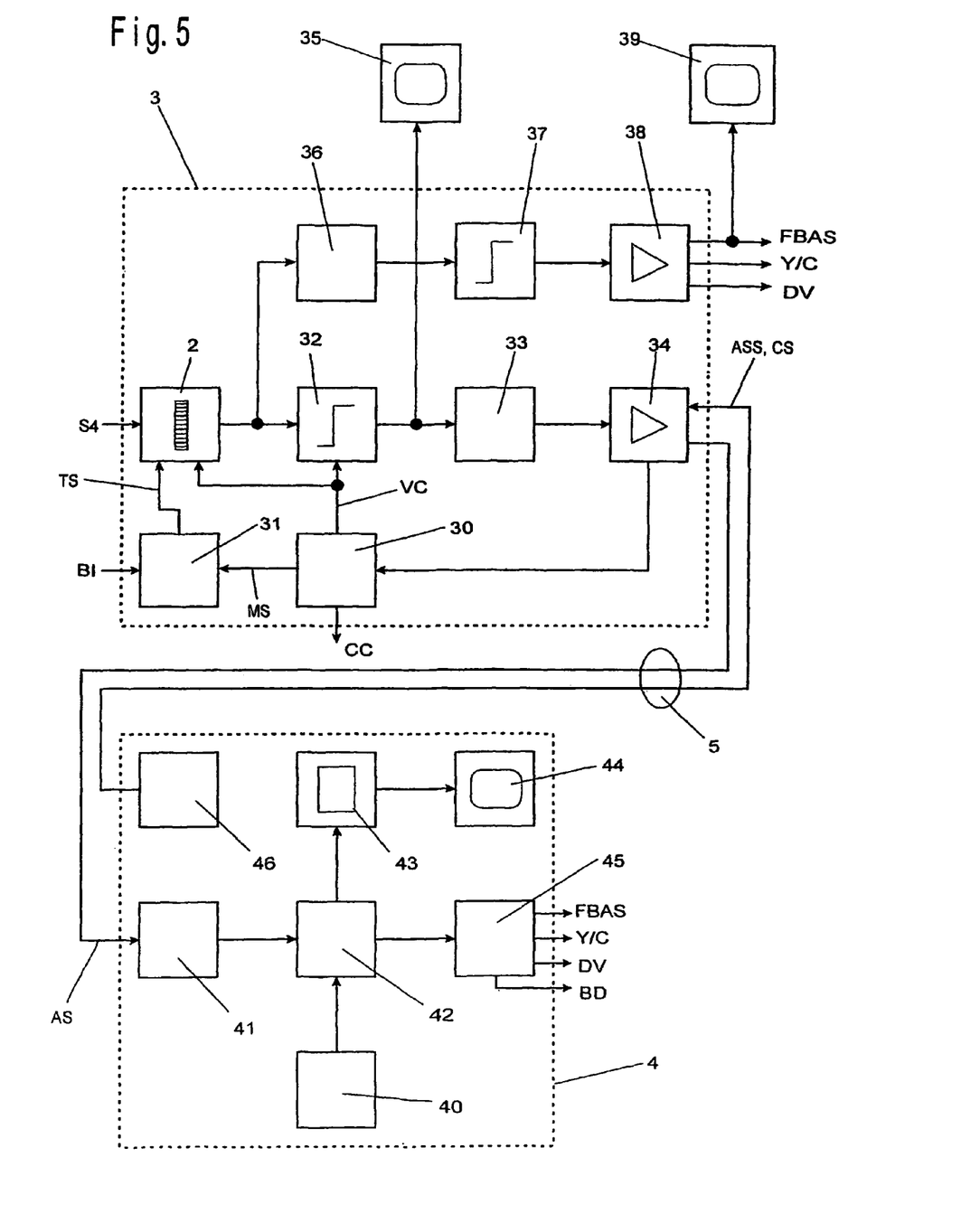

The assist electronics 3 offers according to FIGS. 2 and 5 the possibility of connecting a monitor 35 on which the assist images composed from the digital assist signals can be viewed directly on the moving picture camera.

The personal computer 4 has in addition to an input keyboard an internal or external memory and a monitor, as well as outlet ports for sending a FBAS, Y/C and DV (Digital video) signal well as a signal BD containing image data. The composite colour, image, scanning and synchronising signal FBAS is formed by combining luminance and chrominance signals. The Y/C signal corresponds to the two parts of the luminance Y and chrominance C of the overall colour video signal transferred separately on their own leads. The DV signal is a digital recording format, such as used recently in consumer video recorders or consumer camcorders. It can be recorded on appliances which have corresponding inputs.

The block circuit diagram illustrated in FIG. 2 shows the functional structure of the assist electronics 3 as well as the image processing part of the personal computer 4.

The camera assist device normally mounted in the camera head of the moving picture camera contains the image sensor 2 on which the assist optical path S4 strikes according to FIG. 1, as well as the assist electronics 3. The output of the image sensor 2 is connected to an image editing device 32 which works out a digital colour-correct image from the output signals of the image sensor 2. The output of the image editing device is connected to an image compressing device 33 which carries out data compression in order to keep the amount of data transferred to the personal computer 4 fairly low. The data compressed by the image compressing device 33 is transferred to the personal computer 4 through lead drivers 34 in a computer-standard format as a series of individual images.

A control device 30 produces a link between the camera control and camera electronics 3 and forwards the guidelines on the signal strength, colour setting, possible adjustments of the moving picture camera 1 etc inputted in an input field for operating adjustments 46 of the personal computer 4 to the image sensor 2 as well as the image editing device 32 which receives them as control signals ASS and CS from the personal computer 4 through the lead drivers 34.

An aperture index signal editing device 31 is on the input side charged with the aperture index signal B1 which represents the exposure cycle of the moving picture camera 1, as well as a mode-select signal MS from the PC which provides the exposure mode desired each time. On the output side the shutter index signal editing unit 31 with an edited aperture index signal controls the timing of the image sensor 2 and the integration time T1 in dependence on the exposure cycle of the moving picture camera 1.

After the image editing device 32 there is a signal output on which the image data is issued, preferably in VGA or XVGA format on a corresponding monitor 35 preferably a flat image screen.

The image editing part of the personal computer 4 contains an image storage unit 41 in which the digital assist signals AS transferred through the lead driver 34 of the assist electronics 3 are stored as a series of individual images in a computer-standard format. The image storage unit 41 can consist by way of example of the hard disc of the personal computer 4. The output of the image storage unit 41 is connected to an image editing device 42 in which the still compressed data of the series of individual images are decompressed and edited. An output of the image editing device 42 is connected to a graphics card 43 which converts the series of individual images into a graphic representation for display on a monitor 44 of the personal computer 4. The display of the images on the monitor of the PC is hereby not necessarily in dependence on the moving picture camera. Normally the display is carried out from here in the frequency provided by the graphics card.

A timing control 40 controls the image editing device 42 so that by way of example the series of individual assist images actually issued by the assist electronics 3 with the digital assist signals AS are processed in beats or with the timing of the moving picture camera and are controlled for direct viewing on the monitor 44.

A further output of the image editing device 42 is connected to an image converting device 45 which issues an FBAS signal, Y/C signal, DV signal as well as image data to further display devices and/or video storage devices or video recorder. Through instructions on the PC it is hereby established how to proceed with different film speeds. In a first software mode the images are always transferred in genuine recording time to the video systems, in a second mode the images are always related to the film exposure time of the moving picture camera (Screen-time).

On the assumption that the moving picture camera runs at a recording speed of 15 images per second the camera assist device thus produces correspondingly 15 electronic (assist) full pictures per second. In order to arrive at a PAL system which operates with 50 half-pictures per second 50 half pictures are obtained from the accepted 15 electronic full pictures. Three assist half pictures are obtained from the first electronic assist image, likewise three assist half pictures are obtained from the second electronic image and four assist half pictures are obtained from the third electronic image. The video frequency thereby provides a specific time pattern.

The electronic assist images are repeated as often as assist half pictures until a new electronic assist image becomes available. When the moving picture camera runs with a recording speed of more than 50 images per second assist half pictures are correspondingly omitted.

The second mode is based on the assumption that the images are indeed recorded at 15 images per second with the moving picture camera but they are to be shown in the reproduction with e.g. 24 images per second, thus with a quick motion of $24/15^{th}$ The 15 images would thus be shown in the cinema in 15/24 seconds, thus 0.625 seconds. This corresponds to 31, 25 video half images. On the same principle according to which in the first mode the 15 electronic images were converted into 50 assist half images, they are now converted into 31, 25 assist half pictures, or in order to avoid conflict of uneven numbered assist half images, 125 assist half images are obtained from 60 electronic images. From the first electronic image are obtained two half images, from the second electronic image are obtained likewise two half images and so on until the twelfth electronic image from which three half images are obtained.

Furthermore the personal computer 4 contains an input field 46 for operating settings which issue the control signals ASS and CS through the lead driver 34 to the control device 30 of the assist electronics for detailing the intensity, colour setting and exposure mode as well as where applicable settings of the moving picture camera. In the control device 30 the control signals inputted through the input field 46 of the personal computer 4 are processed and sent as control signals VC to the image sensor 2 as well as the image editing device 32 or are provided through a corresponding interface as camera control signals CC of the moving picture camera.

Figure 3:
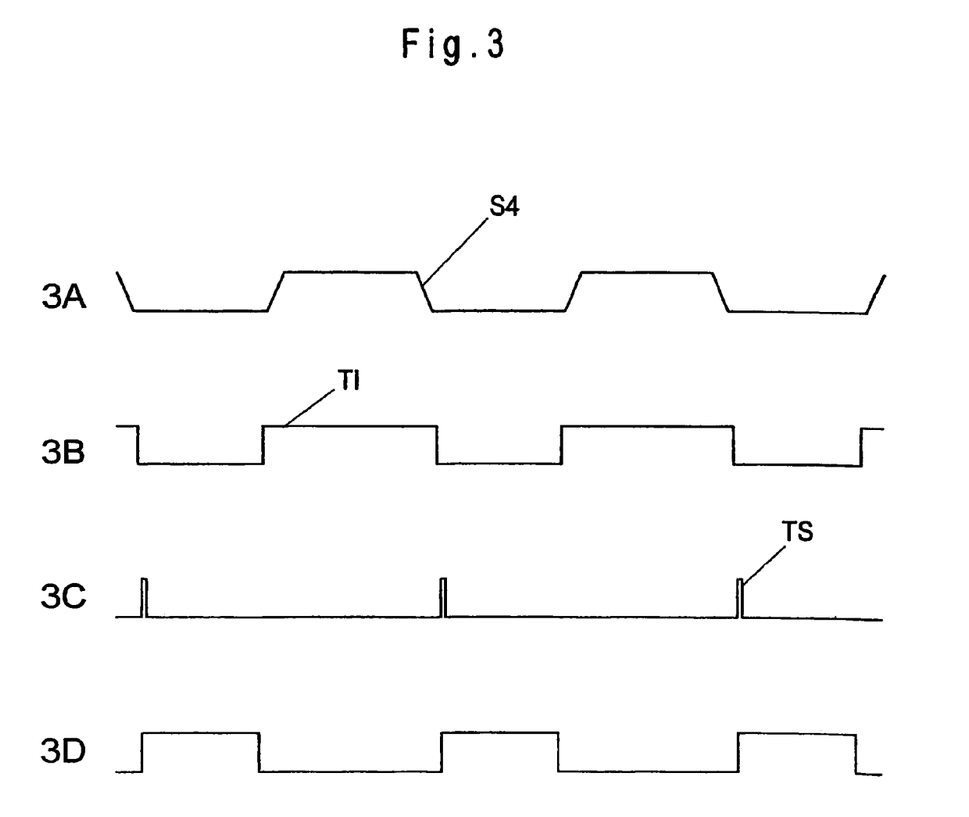
FIG. 3 a time chart for the signals of the camera assist device in a first exposure mode.

The functioning method of the circuit arrangement according to FIG. 2 will now be explained in further detail using the time chart of individual signals in FIGS. 3 and 4 for two different exposure modes.

The assist optical path S4 striking the image sensor 2 is converted into electronic image signals (FIGS. 3A and 4A) and are sent controlled by the control device 30 and the aperture index signal editing unit 31 to the image editing device 32. The aperture index signal editing unit charged with the aperture index signals B1 make the received aperture index signals through a Schmitt Trigger steep flanked and carries out a phase displacement of the received aperture index signals B1. The time during which the light passing from the assist optical path S4 according to FIG. 1 to the image sensor 2 is integrated by the image sensor 2 is thereby produced in dependence on the aperture index signals B1 and thus on the light present in the assist optical path S4 as well as the selected exposure mode.

In a first exposure mode adjustable by means of the mode select signal MS the light passing onto the image sensor 2 from a dark phase over the time period of the light phase in which light is present in the assist optical path S4 up to the next dark phase in which again no light is present in the assist optical path S4, is integrated according to FIG. 3B. This first exposure mode thus leads to maximum bright assist images. The time point at which the integrating of the light through the image sensor 2 ends and then is started again immediately afterwards is not important so long as this time point lies in the dark phase of the assist optical path S4 and thus it is ensured that no undesired light of an aperture pass reaches the image sensor 2. The region of the end of integration can be placed in the middle of the dark phase of the assist optical path S4 which is however not imperative for the function in the first exposure mode.

In practice the image sensor 2 will practically always become light sensitive in this mode. Reading out the image sensor 2 is only started for a short time corresponding to a transfer signal TS. After the information has been retrieved in the image sensor it again becomes light-sensitive.

At the end of integration of the light striking the image sensor 2 the light sensitive coating of the image sensor 2 is retrieved through a signal illustrated in FIG. 3C. The start of the retrieval corresponding to the transfer signal TS can thereby start immediately after the end of the integration of the light controlled through the signal illustrated in FIG. 3B. FIG. 3D shows the signal of the light sensitive layer of the image sensor 2 issued by the image sensor 2 to the image editing device 32. It corresponds to the time in which an electronic image is retrieved from the sensor.

In practice it is not important how long the reading of the light sensitive layer of the image sensor 2 lasts. When copying the light sensitive layer of a CCD chip in its storage zone some few micro seconds pass whilst the reading of a CCD chip in the rolling curtain chutter mode lasts several milliseconds.

In the event that at high film transport speeds and thus large image recording frequencies the time for retrieving the light sensitive layer of the image sensor 2 between the end of the light in the assist optical path S4 up to the beginning of the next period of the light falling into the assist optical path S4 is too short, it is possible to combine several aperture runs of the moving picture camera 1, i.e. several periods of the light falling into the assist optical path S4.

At the end of retrieving the light sensitive coating of the image sensor 2 the image sensor 2 is cancelled or is already cancelled in dependence on the structure form of the image sensor 2. A renewed integration of the light falling into the assist optical path S4 through the image sensor 2 can then begin.

The output signals of the image sensor 2 are sent in dependence on the exposure cycle of the moving picture camera 1 from the image sensor 2 to the image editing device 32 where a digital colour-correct image is calculated from the output signals of the image sensor 2. With single chip image sensors the colour mask of the chip is thereby decoded whilst with image sensors with several chips the images are combined in known way. At the output of the image editing device 32 the digital images are present in the computer-standard format as a series of individual images.

The individual digital assist images calculated from the image editing device 32 are compressed in the image compressing unit 33 with a data compression process in order to keep the amount of data being transferred for the individual digital assist images slight. The compressed image data are thereby transferred through lead drivers 34 to the personal computer 4 in dependence on the time of the moving picture camera 1.

In the personal computer 4 the compressed image data are stored by way of example on the hard disc of the personal computer 4 and are decompressed and edited in the image editing device 42. The decompressed and graphically prepared data are displayed through the graphic card 43 on the monitor 44 of the personal computer 4. The decompression and preparation of the image data as well as the conversion into the graphic card 43 is controlled by the timing control 40. This timing generator is not necessarily coupled to the frequency of the transferred assist images. The transferred digital assist images which agree with the individual film images can thus be reproduced on the monitor 44 in different speed so that by way of example the action of a special recording effect such as slow motion or quick motion can be realistically simulated.

Figure 4:
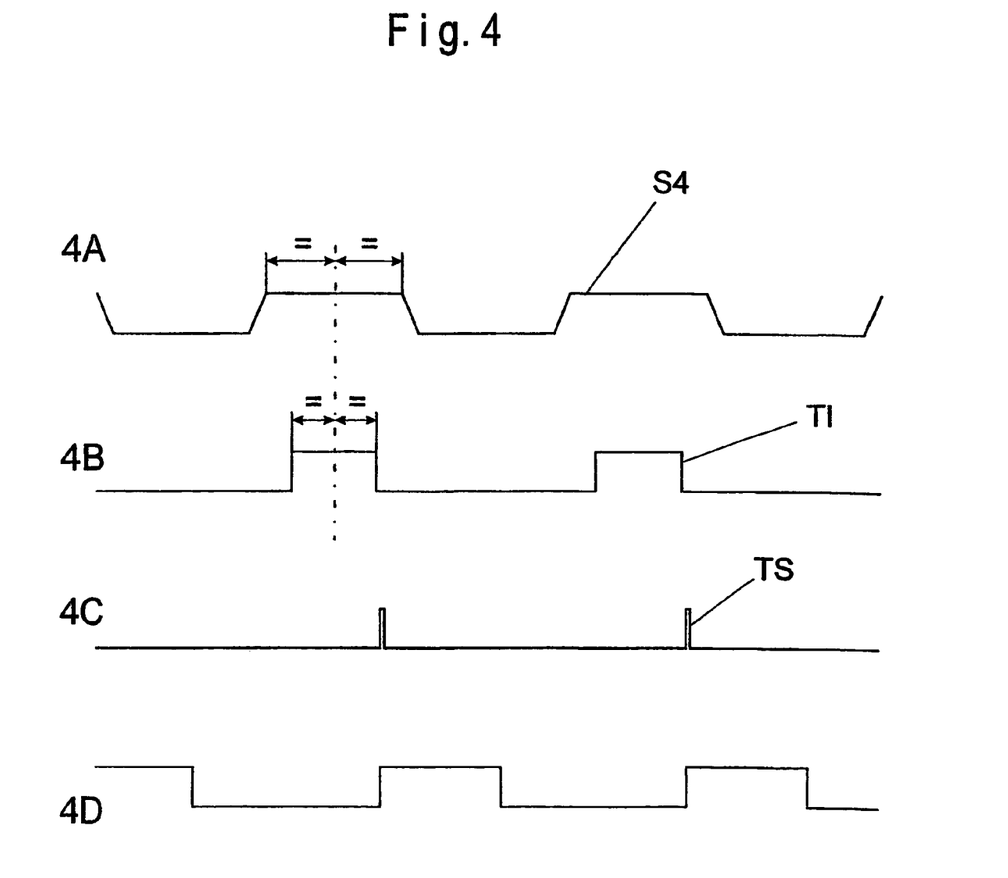
FIG. 4 a time chart for the signals of the camera assist device in a second exposure mode, and FIG. 5 a block circuit diagram of the electronics of the camera assist device with a separate video branch and image-processing part of a personal computer.

With the signal paths shown in FIG. 4 of a second exposure mode the light sensitive layer of the image sensor 2 is exposed considerably shorter whereby the exposure time is directed to the relevant desired or set exposure time. This will as a rule be the exposure time of the moving picture film in the moving picture camera 1. Thus if the mirror aperture 11 of the moving picture camera 1 is small, i.e. the aperture adjustment wing is swivelled back so that the mirror surface comprises a maximum of 180° in order to obtain a certain movement resolution the camera assist device can follow this adjustment of the exposure time of the moving picture film 13 and thus enable a judgment of this effect for real.

FIG. 4A shows the development of the light emerging in the assist optical path S4. Then as described after a phase displacement the exposure time T1 is fixed active for the image sensor 2. The exposure time is thereby as a rule shorter than the light present in the assist optical path S4.

In principle it is indeed immaterial where the exposure time of the image sensor 2 lies within the light phase, but in practice however it is preferred to let the middle point of the exposure time coincide with the middle of the light phase. This is shown by the signal path according to FIGS. 4A and 4B where the integration of the light is set in the middle of the light phase of the assist optical path S4.

The further signal path in the second exposure mode corresponds to the path described above with reference to FIG. 3 of the first exposure mode.

The block circuit diagram shown in FIG. 5 shows the function build up of an advantageous development of the assist electronics 3 as well as the image processing part of the personal computer 4, whereby all the structural elements shown in FIG. 2 fulfil the same function in this further development and are correspondingly provided with the same reference numerals and are used parallel to the assist branch described so that another description has been omitted at this point.

Directly after the image sensor 2 which—as already described above—undertakes the integration of the light present in the assist optical path S4 controlled by the light/dark phases, a signal path branches off to a storage unit 36 which consists of an intensifier, an A/D converter, an image store and a D/A converter. The signals of the image sensor 2 are issued controlled by the light/dark phases in the assist optical path S4 from the image sensor 2, intensified and converted into digital assist signals. These digital assist signals are—always still in dependence on the light/dark phases in the assist optical path S4—inputted into the image store. The digital assist signals are then retrieved with the frequency of the desired system, thus with 50 full images per second with the PAL systems and 60 full pictures per second with an NTSC system.

After the retrieval the digital assist signals are converted back through the D/A converter into analogue signals and then by means of a video circuit such as is known from video cameras, converted into regular video signals. The video circuit, together with an image inserter through which additional data can be inserted into the video image, is marked by reference number 37.

Finally the video signals still run through an output stage 38 in order to be able to be used on conventional interfaces, e.g. a 75 Ohm BNC output for FBAS signal. These outputs can likewise again be branched off for a small video monitor 30 whereby it is not important which of the output signals is used. The additional video monitor 39 parallel to the output for the monitor 35 offers the advantage that in the depicted design both pure video monitors and also VGA monitors can be attached.

The combination of the design known per se with analogue video outputs and the digital signal variations according to the invention with variable transmission speed offers the user the possibility of recording and displaying scenes in which no speed effects happen without the additional personal computer 4. The personal computer 4 is thus only then connected when it is required owing to the speed effects or for the better quality of digital images.

LIST OF REFERENCE NUMERALS

1 Moving picture camera
2 Opto-electronic converter
3 Assist electronics
4 Personal Computer
5 Fire-wire interface
10 Recording lens
11 Rotating mirror aperture
12 Image window
13 Moving picture film
14 Matt screen or fibre plate
15 First beam divider
16 Eyepiece
17 Second beam divider
18 Exposure meter
19 Assist optic
30 Control device
31 Aperture index signal editing unit
32 Image editing device
33 Image compressing device
34 Lead driver
35 Monitor
36 Storage unit
37 Video circuit and image inserter
38 Output stage
39 Video monitor
40 Timing control
41 Image storage unit
42 Image editing device
43 Graphics card
44 Monitor
45 Image converting device
S1 Recording optical path
S2 Beam part
S3 Viewfinder optical path
S4 Assist optical path
S5 Exposure meter optical path
AB1 Edited aperture index signal
BD Signal containing image data
B1 Aperture index signal
CC Camera control signals
AS Assist control signal
DV Digital video signal
FBAS Colour, image, scanning and synchronising signal
VC Control signal
AS Digital assist signal
ASS Assist control signal
Y/C Luminance and chrominance signal

The invention claimed is:

1. A method for processing film images which are deviated from a film-recording optical path of a moving picture camera having a rotating mirror aperture and which are converted into digital assist signals (AS) with the aid of an optoelectronic converter which is arranged in the optical path of the moving picture camera which is periodically interrupted by said rotating mirror aperture according to an image-recording frequency of the moving picture camera, said image recording frequency being variable and dependent on a rotational space of said rotating mirror aperture, said digital assist signals (AS) being sent to a data processing device with an image frequency which only coincides with the image recording frequency of the moving picture camera without an intermediate storage of the digital assist signals (AS) in a frequency of the optoelectronic converter and without retrieval of the digital assist signals (AS) in a standard PAL or NTSC video signal frequency, said data processing device processing the assist images derived from the digital assist signals (AS) at the image-recording frequency of the moving picture camera.

2. The method according to claim 1, wherein the data processing device sends the digital assist images to a digital storage device at an assist image frequency or the image recording frequency of the moving picture camera.

3. The method according to claim 1, wherein the data processing device sends the digital assist signals (AS) for display of assist images to a monitor with a desired image frequency.

4. The method according to claim 1, wherein in a first signal path the video signals are passed with a video signal frequency corresponding to a video norm through a standard interface to conventional video interfaces.

5. The method according to claim 4, wherein in a second signal path the digital assist signals (AS) are sent to the data processing device at a signal frequency which coincides with the image recording frequency of the moving picture camera.

6. The method according to claim 1, wherein in a case of an image recording frequency of the moving picture camera which is greater than the maximum data rate to be transferred or which can be achieved by the optoelectronic converter, a second or multiple assist image is sent to the data processing device.

7. The method according to claim 1, wherein assist control signals are transferred by the data processing device through an interface to the moving picture camera.

8. The method according to claim 1, wherein additional recording, control or status signals (CS) are transferred from the moving picture camera through an interface to the data processing device.

9. The method according to claim 1, wherein a selectable control, status and/or recording data are inserted as meta data into the assist image.

10. The method according to claim 9, wherein the meta data are displayed on a monitor outside of an image zone.

11. The method according to claim 1, wherein aperture index signals (B1) corresponding to light conditions in the assist optical path of the moving picture camera are sent through an aperture index signal editing unit to the optoelectronic converter which in dependence on edited aperture index signals for its integration time in a predetermined exposure mode integrates the light in the assist optical path and wherein the integrated light is retrieved at the end of integration from an image editing device.

12. The method according to claim 11, wherein in a first exposure mode light is integrated in the assist optical path from one dark phase of the assist optical path up to a next dark phase.

13. The method according to claim 11, wherein in a second exposure mode, an exposure time of the optoelectronic converter is set to a predeterminable value, corresponding to the film exposure time of the moving picture camera.

14. The method according to claim 12, wherein an exposure time is shorter than a duration of the light phase in the assist optical path, wherein the integration starts and ends in a light phase and wherein the optoelectronic converter is read after the end of integration.

15. The method according to claim 13, wherein the integration starts and ends in the same light phase.

16. The method according to claim 11, wherein a middle of a set exposure time of the optoelectronic converter is set to a middle of the light phase in the assist optical path.

17. The method according to claim 11, wherein the image editing device calculates from integrated output signals of the optoelectronic converter a digital assist image whereby with the single optoelectronic converter a colour mask of the optoelectronic converter is decoded and with several other optoelectronic converters the digital assist images of the optoelectronic converter are combined with each other and wherein the image editing device sends out the image data of the digital assist images.

18. The method according to claim 17, wherein the image data of the digital assist images are compressed in an image compressing device and are sent to the data processing device through lead drivers in dependence on the image recording frequency of the moving picture camera.

19. The method according to claim 18, wherein the data processing device stores and decompresses the image data of the digital assist images and edits them for display on a monitor controlled by a timing control.

20. The method according to claim 1, wherein through a return lead from the data processing device to a camera assist device control and assist control signals (CS, ASS) are sent to a control device of a camera-assist device which sends control signals (VC) to the optoelectronic converter and/or image editing device or provides such control signals through an interface as camera control signals of the moving picture camera.

21. The method according to claim 20, wherein the signal and data exchange between the camera assist device and data processing device are binary coded.

22. The method according to claim 21, wherein signals and data are transferred through light wave conductors or glass fibres, by means of a carrier frequency system or through an infra red interface.

23. An apparatus for carrying out the method according to claim 1, comprises a variable image recording frequency of the moving picture camera, a camera-assist device with an image sensor directed to the assist optical path, and the data processing unit which receives the digital assist signals (AS) sent from the camera assist device at an image frequency which coincides with the image recording frequency of the moving picture camera and which processes the digital assist images assembled from the digital assist signals (AS) at the image recording frequency of the moving picture camera.

24. The device according to claim 23, the data processing device is connected to at least one of a digital storage device and monitor.

25. The device according to claim 23 wherein the data processing device comprises a personal computer and a monitor.

26. The device according to claim 23, wherein the camera-assist device is connected to the data processing unit through a fire-wire interface.

27. The device according to claim 23, wherein the image sensor mounted in the assist optical path of the moving picture camera comprises a CCD chip, C-MOS-image sensor or an image tube.

28. The device according to claim 27, wherein the CCD chip or CMOS image sensor operates in a progressive scan operation.

29. The device according to claim 27, wherein the image sensor comprises an interlaced chip.

30. The device according to claim 23, wherein the data processing unit provides moving picture, stationary picture, fast search forwards, fast search backwards, forward and return control.

31. The device according to claim 23, comprising an input field for operating settings which are executed through graphically displayed operating elements of the data processing unit and at which guidelines can be set on signal intensification, colour setting, and on settings of the moving picture camera.

* * * * *